United States Patent [19]

Pagano et al.

[11] Patent Number: 4,493,390
[45] Date of Patent: Jan. 15, 1985

[54] APPARATUS FOR THE COMBINED PRODUCTION OF ELECTRICAL ENERGY AND HEAT

[75] Inventors: Roberto Pagano, Turin; Alessandro Nannini, Bruino, both of Italy

[73] Assignee: Fiat Auto S.p.A., Turin, Italy

[21] Appl. No.: 465,401

[22] Filed: Feb. 10, 1983

[30] Foreign Application Priority Data

Feb. 11, 1982 [IT] Italy ............................... 52918/82[U]

[51] Int. Cl.³ ............................................... F01N 1/24
[52] U.S. Cl. ................................... 181/204; 181/283; 165/52
[58] Field of Search ............... 181/204, 202, 200, 211, 181/283; 165/162, 51, 52, 53, DIG. 4; D23/47

[56] References Cited

U.S. PATENT DOCUMENTS 4,226,214 10/1980 Palazzetti ........................ 165/52 X Primary Examiner—L. T. Hix
Assistant Examiner—Brian W. Brown
Attorney, Agent, or Firm—Sughrue, Mion, Zinn, Macpeak and Seas

[57] ABSTRACT

The apparatus is enclosed in thermally and acoustically insulating panels supported by a framework. Each panel has a peripheral gasket which seals against adjacent surfaces of the framework to provide improved thermal and acoustic insulation.

7 Claims, 4 Drawing Figures

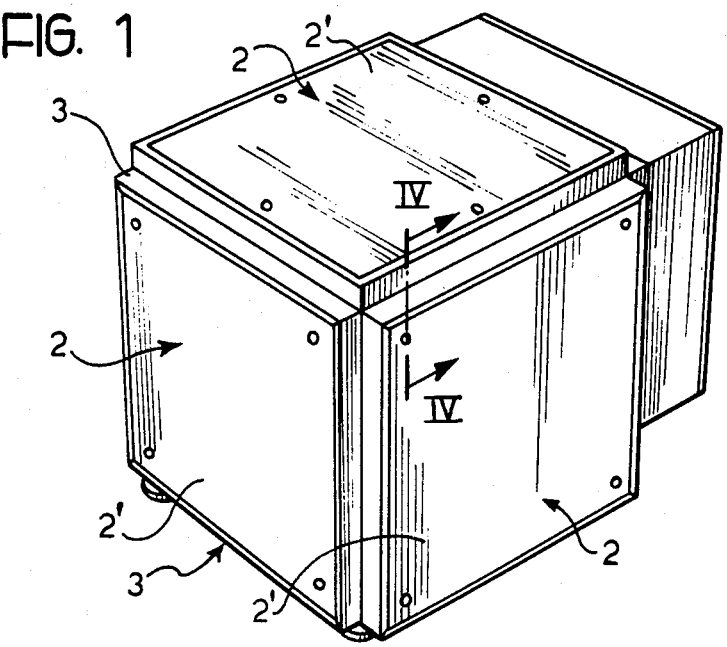
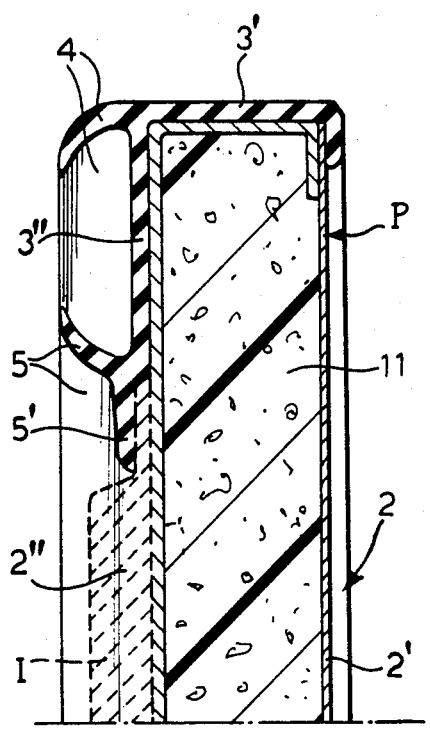
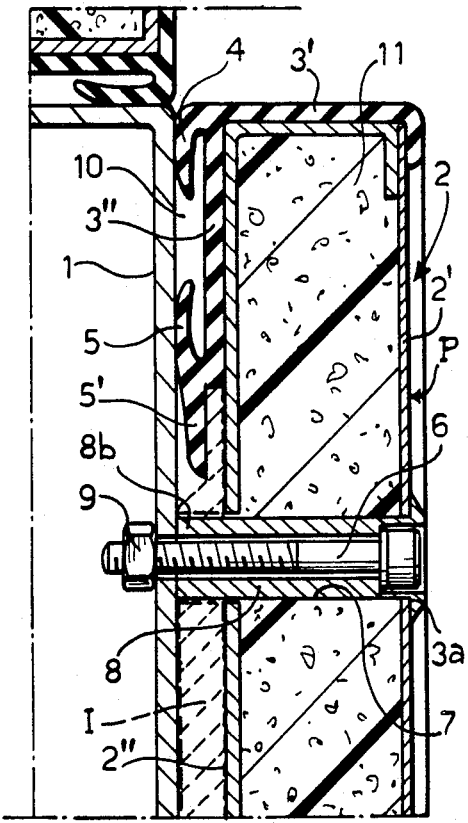

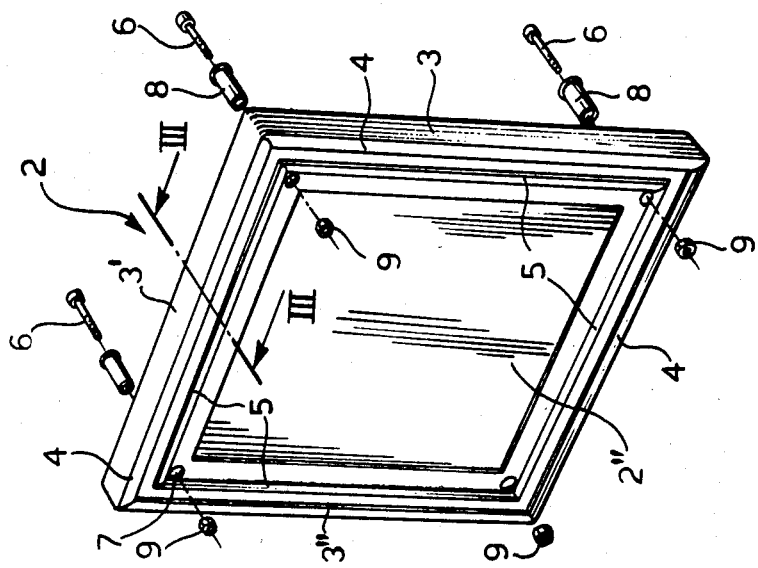
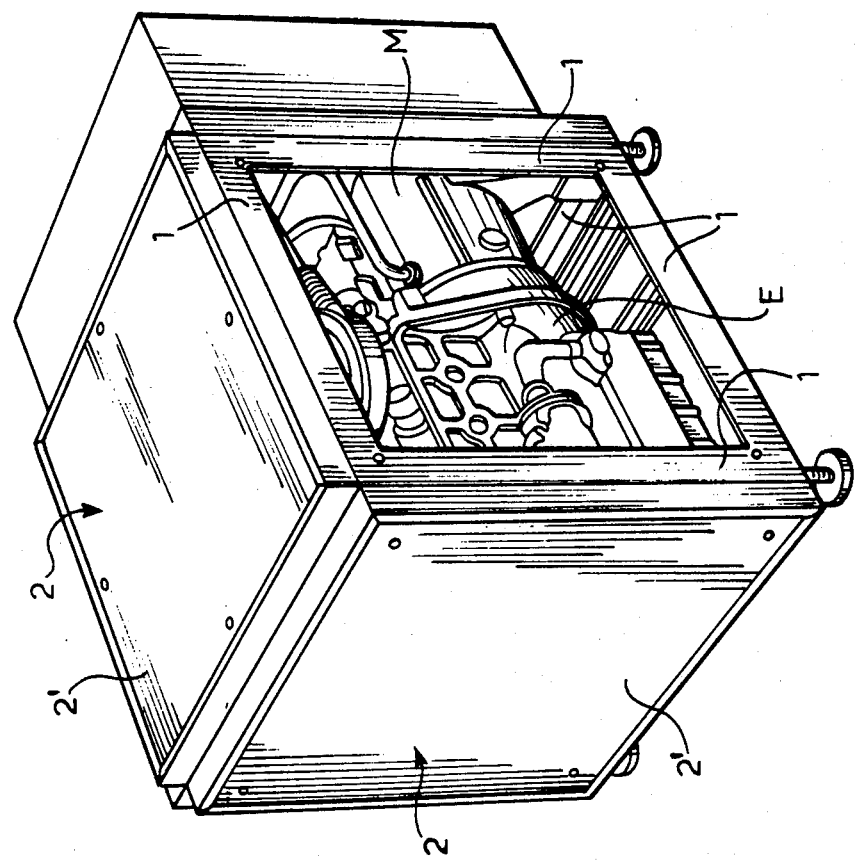
FIG. 2

APPARATUS FOR THE COMBINED PRODUCTION OF ELECTRICAL ENERGY AND HEAT

The present invention relates to apparatus for the combined production of electrical energy and heat, more particularly apparatus of the type including a supporting framework constituted by sectional elements located at the edges of a parallelepiped and supporting an internal combustion engine, and asynchronous electrical generator device coupled to the engine, and means for recovering the energy transformed into heat in the engine and in the electrical device.

Apparatus of this type is described, for example, in U.S. Pat. No. 4,226,214 in the name of the Applicant. In the apparatus described in this Patent the side faces and the upper face of the parallelepiped defined by the framework are covered by thermally and acoustically insulating panels removably fixed to the framework.

The object of the present invention is to provide apparatus of the aforesaid type with covering panels which are simple and economical to manufacture and give better thermal and acoustic insulation.

In order to achieve this object, the present invention provides apparatus for the combined production of electrical energy and heat including a supporting framework constituted by sectional elements located at the edges of a parallelepiped, the side faces and the upper face of the parallelepiped defined by the framework being covered with thermally and acoustically insulating panels releasably fixed to the framework, characterised chiefly in that each panel is framed by a continuous gasket of elastomeric material having an essentially L-shaped transverse section with a first portion which covers the peripheral surface of the panel and a second portion which covers a portion of the surface of the panel which, in the assembled condition, faces the framework; from the said second portion of the gasket, there project first and second curved lips adjacent and extending parallel to the periphery of the panel, each lip being concavely curved towards the other.

The invention will be further described, by way of example, with reference to the appended drawings, in which:

FIG. 1 is a perspective view of apparatus according to one embodiment of the invention;

FIG. 2 is a partially exploded perspective view of the apparatus shown in FIG. 1;

FIG. 3 is a sectional view of part of the apparatus, taken on line III—III of FIG. 2, and FIG. 4 is a sectional view taken on line IV—IV of FIG. 1.

With reference to FIGS. 1 and 2, an apparatus for the combined production of electrical energy and heat according to the invention includes a supporting framework constituted by sectional elements 1 located at the edges of a cube. The side faces and the upper face of the cube defined by the sectional elements 1 are covered with thermally and acoustically insulating panels 2 releasably fixed to the framework.

The framework described above supports within it an internal combustion engine E, an asynchronous electrical generator device M coupled to the engine E, and means, not illustrated, for recovering the energy transformed into heat in the engine E and in the electrical generator device M.

As shown in FIGS. 2 to 4, each panel 2 is framed by a continuous gasket 3 having an essentially L-shaped transverse section, with a first portion 3' which covers the peripheral surface of the panel and a second portion 3" which covers a portion of the surface 2" of the panel which, in the assembled condition, faces the framework.

Two curved lips 4, 5 project from the second portion 3" of the gasket 3, the lips 4, 5 extending parallel to and adjacent the periphery of the respective panel 2. Each lip 4, 5 is concavely curved towards the other lip.

The gasket 3 is preferably made from an elastomeric material.

A tab 5' projects from the convex surface of the lip 5 of the gasket 3. The second gasket portion 3" is formed with a step adjoining the tab 5' so that in the assembled condition of the gasket, the surface of the tab 5' facing the underlying panel 2 defines with the face 2" of the latter a space for receiving and retaining the edge of a removable thermally and acoustically insulating layer I, shown in broken outline in FIGS. 3 and 4. The use of such an insulating layer increases the thermal and acoustic insulation of the apparatus.

The panels 2 are fixed to the sectional elements 1 constituting the framework by means of bolts 6 (FIG. 4) which pass through holes 7 provided in the panels. Each hole 7 is lined by a sleeve 8 which acts as a guide for the respective fixing bolt 6. Each sleeve 8 has a flanged head 8a which upon fitting of the panel bears against the surface 2' of the panel 2 surrounding the hole 7, on the side opposite the framework. The length of the sleeve 8 is greater than the thickness of the panel so that, in the assembled condition, the end 8b of the sleeve 8 opposite the head 8a projects beyond the respective hole 7 towards and against the framework (FIG. 4) and serves to space the panel 2 from the framework.

The panels 2 are fixed to the framework by means of nuts 9 threaded onto the bolts 6. Upon tightening the nuts 9 on the bolts 6 the lips 4, 5 of each gasket 3 are resiliently deformed against the sectional elements 1 so that these lips, together with the portion 3" of the gasket 3 and the sectional elements 1, define a sealed air chamber 10 (FIG. 4) acting as an interspace.

The air-filled chambers 10 impede the propagation of heat and of sound waves from the interior of the apparatus towards the exterior.

Preferably each panel 2 comprises a rigid casing P (FIG. 3) filled with a thermally and acoustically insulating material 11, preferably of cellular structure, for example, expanded polyurethane. This material may be injected into the casing P in a conventional manner through filler apertures, not illustrated.

The free edge of the first portion 3' of each gasket 3 is bent over and into contact with the outer face 2' of the respective panel 2, as shown in FIGS. 3 and 4.

Each gasket 3 may be firmly fixed and correctly located on the respective panel 2 without the need for glue of adhesive.

The panels 2 ensure effective thermal and acoustic insulation and furthermore may easily be removed from the framework to allow inspection or repair of the apparatus.

Naturally, constructional details of practical embodiments of the apparatus may be varied widely without thereby departing from the scope of the present invention.

We claim:

1. Apparatus for the combined production for electrical energy and heat, including a supporting framework constituted by sectional elements arranged at the edges of a parallelepiped and supporting an internal combustion engine, an electrical generator device coupled to the engine, and means for recovering the energy transformed into heat in the engine and in the electrical device; and further including thermally and acoustically insulating panels removably fixed to the framework and covering the side faces and the upper face of the parallelepiped defined by said framework, wherein each said panel is provided with a continuous peripheral gasket of elastomeric material having an essentially L-shaped transverse section with a first portion which covers the peripheral surface of the panel and a second portion which covers a portion of the face of the panel which, in the assembled condition, faces the framework, and wherein the said second portion of the gasket is provided with projecting first and second curved lips adjacent and parallel to the periphery of the panel, each said lip being concavely curved towards the other lip, wherein spacer elements project from the said face of each panel facing the framework to maintain the panel at a predetermined distance from the framework when the panel is fixed to the framework, whereby the curved lips of the gasket fitted to the panel are resiliently deformed against the framework and, together with the framework and the second portion of the gasket, define a sealed air chamber.

2. Apparatus as defined in claim 1, wherein a peripheral tab projects from the convex surface of the lip which is remote from the periphery of the panel, the tab of each gasket, in the assembled condition of the gasket, defining with the inner face of the associated panel a space for receiving the edge of a supplementary, removable layer of thermally and acoustically insulating material.

3. Apparatus as defined in claim 1, wherein each of the panels is fixed to the framework by means of fixing bolts which extend through holes provided in each panel.

4. Apparatus as defined in claim 3, including respective sleeves lining the holes, each said sleeve acting as a guide for a respective said fixing bolt and each sleeve having a flanged head which bears against a part of the face of the panel opposite the framework, surrounding the respective hole, the axial length of each sleeve being greater than the thickness of the panel, so that, upon assembly, the end of the sleeve opposite the flanged head projects beyond the respective hole in the panel towards and against the framework and serves to space the panel from the framework.

5. Apparatus as defined in claim 1 wherein the free edge of the first portion of each of the said gaskets is bent over the outer face of the panel which, in the assembled condition of the panel, is opposite the framework.

6. Apparatus as defined in claim 1, wherein each panel includes a substantially parallelepiped shaped rigid casing filled with an acoustically and thermally insulating material.

7. Apparatus as defined in claim 6, wherein that the casing is filled with an expanded polyurethane.

* * * * *